United States Patent [19]

Yang

[11] Patent Number: 5,546,661
[45] Date of Patent: Aug. 20, 1996

[54] GARDENING SHEARS

[76] Inventor: Chung-Jeng Yang, 58, Ma Yuan West St., Taichung, Taiwan

[21] Appl. No.: 554,962

[22] Filed: Nov. 13, 1995

[51] Int. Cl.⁶ ...................................................... B25F 1/00
[52] U.S. Cl. ................................................. 30/146; 7/134
[58] Field of Search ............................ 30/131, 145, 146, 30/262, 309, 330; 7/129, 134, 158

[56] References Cited

U.S. PATENT DOCUMENTS

| | | | |
|---|---|---|---|
| 140,388 | 7/1873 | Rogers | 30/146 |
| 146,744 | 1/1874 | Bartly | 30/146 |
| 209,587 | 11/1878 | Rose | 7/134 |
| 1,179,595 | 4/1916 | Wood | 30/146 |
| 3,339,281 | 9/1967 | Chow | 30/262 |

*Primary Examiner*—Hwei-Siu Payer

[57] ABSTRACT

A pair of shears has a fixed blade, a fixed handle connecting the fixed blade, a driving blade, and a driving handle connecting the driving blade, a spring between two handles, a pin on the crisscross portion between two blades, and a switch button on the outer side of the fixed handle. The first threaded hole and the first positioning post are formed on the front of the fixed blade. The second threaded hole and the second positioning post are formed on the inner side of the fixed handle. A cutting device such as a saw blade and a scikle is disposed in front of the fixed blade. A through hole and a positioning hole are formed on the rear of the cutting device. The first positioning post inserts in the positioning hole. A screw passes through the through hole and the first threaded hole to fasten the cutting device.

3 Claims, 4 Drawing Sheets

GARDENING SHEARS

BACKGROUND OF THE INVENTION

The invention relates to a pair of gardening shears. More particularly, the invention relates to a pair of gardening shears with a scikle or a saw blade.

Conventional gardening shears cannot cut a limb at all. The user has to prepare a saw to cut a limb or a big branch. When the gardening shears cannot reach the higher branches of the tree, the user should use a scikle or a saw to cut the branches.

SUMMARY OF THE INVENTION

An object of the invention is to provide a scikle to connect a pair of gardening shears to cut limbs.

Another object of the invention is to provide a saw blade to connect a pair of gardening shears to saw limbs.

Accordingly, a pair of shears has a fixed blade, a fixed handle connecting the fixed blade, a driving blade, and a driving handle connecting the driving blade. A compressed spring is disposed between two handles. A pin is disposed on the crisscross portion between two blades. A switch button is disposed on the outer side of the fixed handle. The first threaded hole and the first positioning post are formed on the front of the fixed blade. The second threaded hole and the second positioning post are formed on the inner side of the fixed handle. A cutting device is disposed in front of the fixed blade. A through hole and a positioning hole are formed on the rear of the cutting device. The cutting device is disposed in front of the fixed blade. The first positioning post inserts in the positioning hole. A screw passes through the through hole and the first threaded hole to fasten the cutting device.

DETAILED DESCRIPTION OF THE INVENTION

Figure 1:
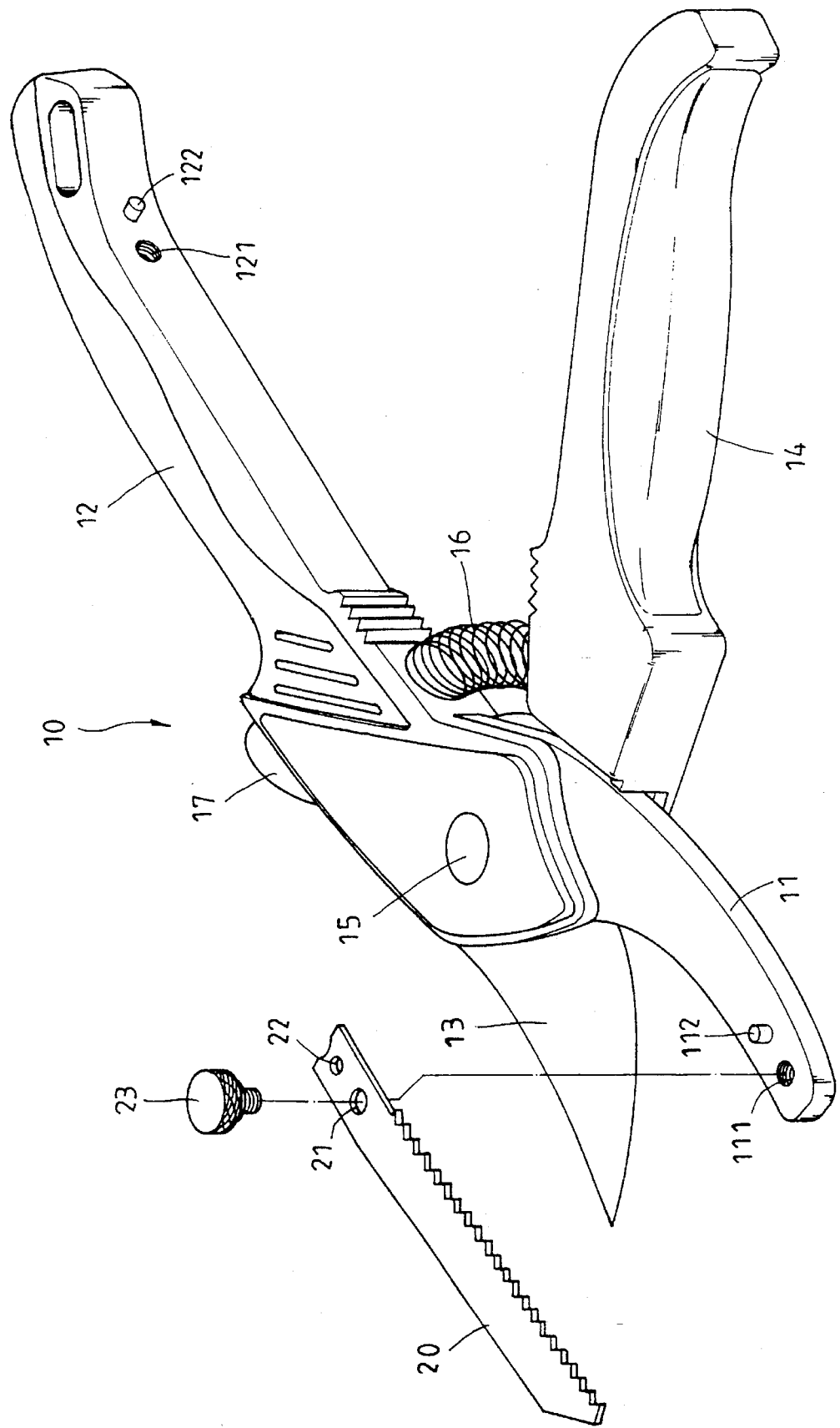
FIG. 1 is a partly perspective exploded view of a saw blade and a pair of shears in accordance with the invention.

Referring to FIGS. 1 to 4, a pair of shears 10 has a fixed blade 11, a fixed handle 12 connecting the fixed blade 11, a driving blade 13, and a driving handle 14 connecting the driving blade 13. A compressed spring 16 is disposed between two handles 12 and 14. A pin 15 is disposed on the crisscross portion between two blades 11 and 13. A switch button 17 is disposed on the outer side of the fixed handle 12 to control the opening or closing of the driving handle 14.

The features of the invention will be described as follows.

Figure 3:
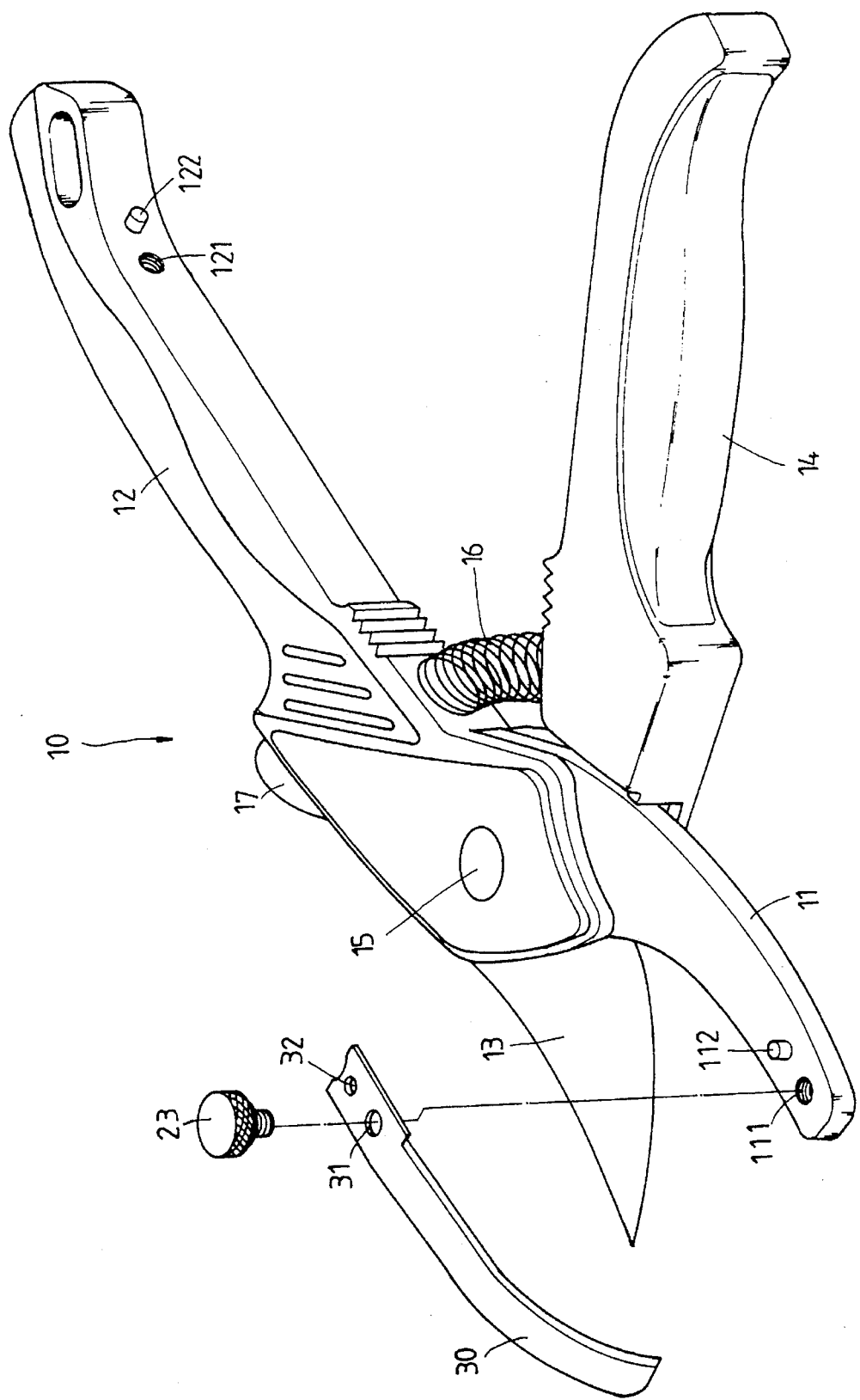
FIG. 3 is a partly perspective exploded view of a scikle and a pair of shears in accordance with the invention.

Referring to FIGS. 1 and 3, the first threaded hole 111 and the first positioning post 112 are formed on the front of the fixed blade 11. The second threaded hole 121 and the second positioning post 122 are formed on the inner side of the fixed handle 12.

Figure 2:
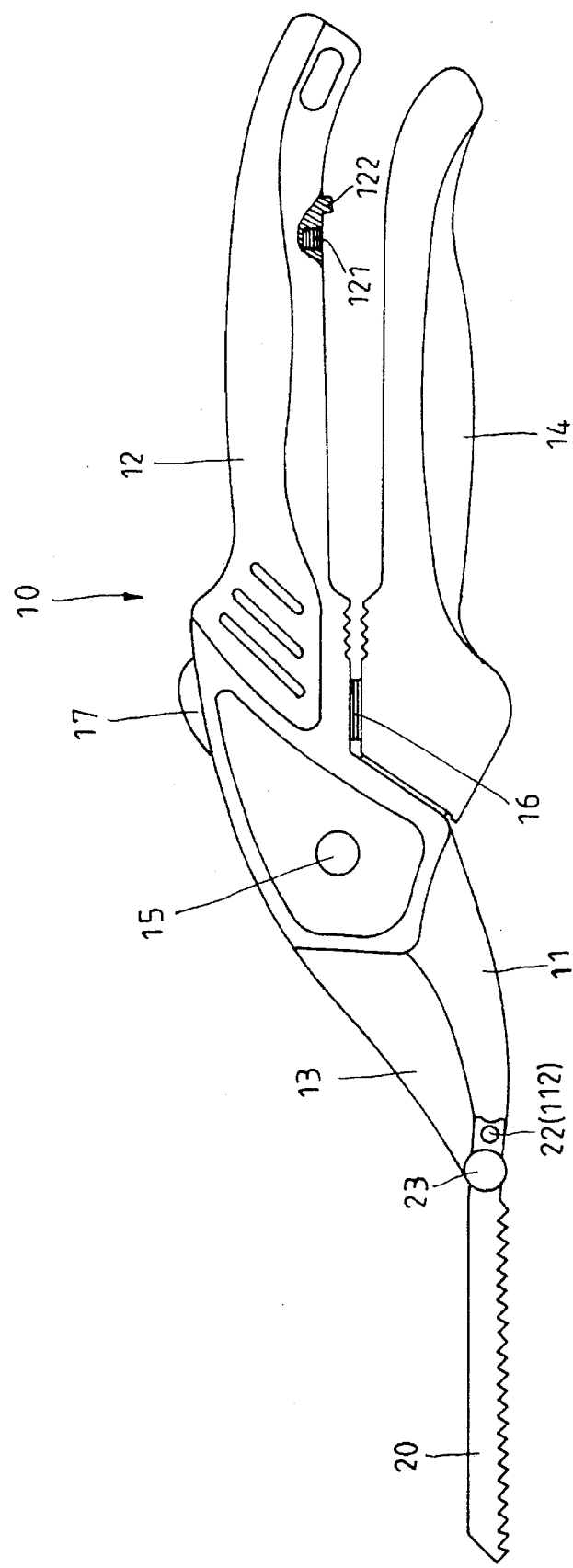
FIG. 2 is a side elevational view of FIG. 1.

Referring to FIGS. 1 and 2, a saw blade 20 with a through hole 21 and a positioning hole 22 is disposed in front of the fixed blade 11. The first positioning post 112 inserts in the positioning hole 22. A screw 23 passes through the holes 21 and 111 to fasten the saw blade 20 and the fixed blade 11. When the saw blade 20 is not in operation, the screw 23 can be unscrewed. The saw blade 20 can be fastened on the inner side of the fixed handle 12. The second threaded hole 121 and the second positioning post 122 matches the corresponding through hole 21 and positioning hole 22, respectively.

Figure 4:
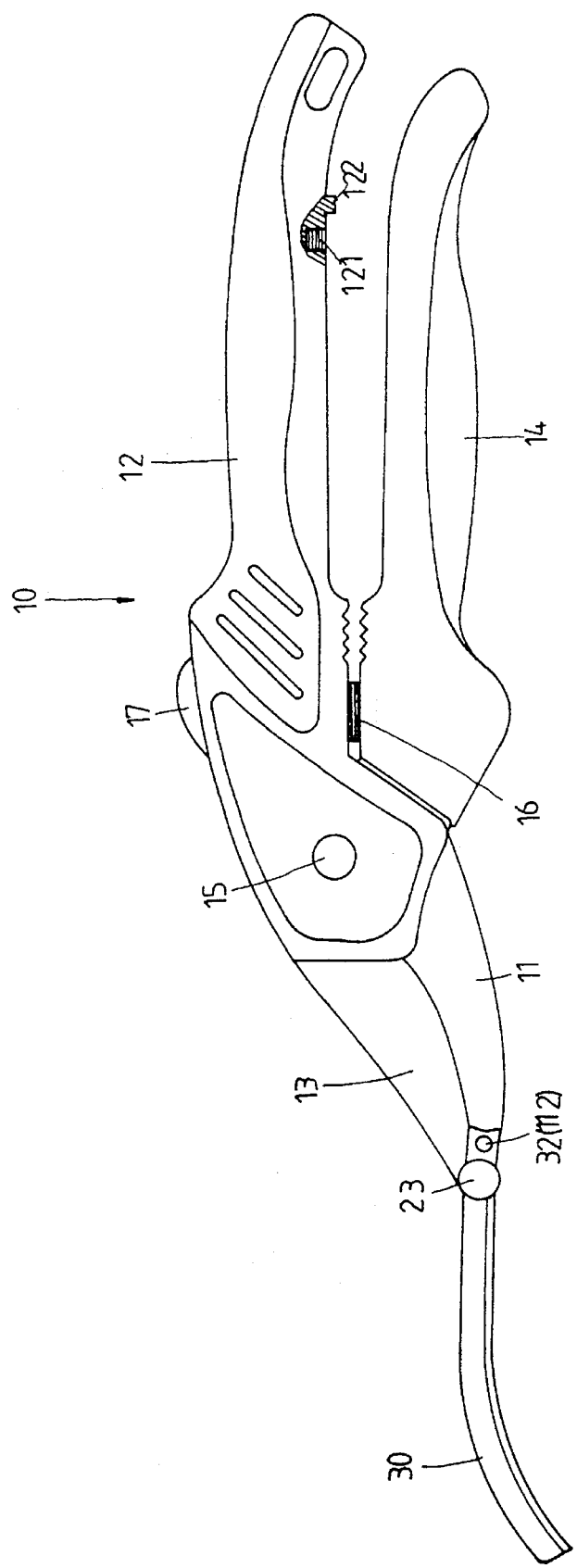
FIG. 4 is a side elevational view of FIG. 3.

Referring to FIGS. 3 and 4, a scikle 30 with a through hole 31 and a positioning hole 32 is disposed in front of the fixed blade 11. The first positioning post 112 inserts in the positioning hole 32. A screw 23 passes through the holes 31 and 111 to fasten the scikle 30 and the fixed blade 11. When the scikle 30 is not in operation, the screw 23 can be unscrewed. The scikle 30 can be fastened on the inner side of the fixed handle 12. The second threaded hole 121 and the second positioning post 122 matches the corresponding through hole 31 and positioning hole 32, respectively.

The operation of the sickle and the saw blade will be described as follows.

Referring to FIG. 2, the switch button 17 is placed in the closing state after the saw blade 20 is positioned in front of the shears 10. The fixed handle 12 and the driving handle 14 are in the closing state to become a grip of the saw blade 20.

Referring to FIG. 4, the switch button 17 is placed in the closing state after the scikle 30 is positioned in front of the shears 10. The fixed handle 12 and the driving handle 14 are in the closing state to become a grip of the scikle 30.

Since the gardening shears can be extended by the scikle or the saw blade, the gardening shears can reach the higher branches of the tree easily. The saw blade in front of the gardening shears can saw a limb or a big branch. The scikle in front of the gardening shears can cut a limb or a big branch also. The scikle and the saw blade can be attached to the inner side of the fixed handle while they are not used, so the user need not carry an additional saw or scikle at all. The handles of the gardening shears become the grip of the scikle or the saw blade while the scikle or the saw blade is in operation.

The invention is not limited to the above embodiments but various modification thereof may be made. It will be understood by those skilled in the art that various changes in form and detail may be made without departing from the scope of the invention.

I claim:

1. A pair of shears having a fixed blade, a fixed handle connecting said fixed blade, a driving blade, a driving handle connecting said driving blade, a compressed spring disposed between said fixed handle and said driving handle, a pin disposed on a crisscross portion between said fixed blade and said driving blade, and a switch button disposed on an outer side of said fixed handle, and wherein the improvement comprises:

a first threaded hole and a first positioning post formed on a front of said fixed blade;

a second threaded hole and a second positioning post formed on an inner side of said fixed handle;

a cutting device disposed in front of said fixed blade;

a through hole and a positioning hole formed on a rear of said cutting device;

said first positioning post inserting in said positioning hole; and a screw passing through said through hole and said first threaded hole to fasten said cutting device.

2. A pair of shears as claimed in claim 1, wherein said cutting device is a scikle.

3. A pair of shears as claimed in claim 1, wherein said cutting device is a saw blade.

* * * * *